US012649349B2

(12) United States Patent
    Cha

(10) Patent No.: US 12,649,349 B2
(45) Date of Patent: Jun. 9, 2026

(54) HEAT PUMP SYSTEM FOR A VEHICLE

(71) Applicants:HYUNDAI MOTOR COMPANY,
             Seoul (KR); KIA CORPORATION,
             Seoul (KR)

(72) Inventor: Yong Woong Cha, Yongin-si (KR)

(73) Assignees: HYUNDAI MOTOR COMPANY,
              Seoul (KR); KIA CORPORATION,
              Seoul (KR)

( * ) Notice: Subject to any disclaimer, the term of this
             patent is extended or adjusted under 35
             U.S.C. 154(b) by 134 days.

(21) Appl. No.: 18/636,942

(22) Filed: Apr. 16, 2024

(65) Prior Publication Data

US 2025/0319737 A1    Oct. 16, 2025

(51) Int. Cl.
     *B60H 1/00*        (2006.01)
     *B60H 1/14*        (2006.01)
(52) U.S. Cl.
     CPC ..... *B60H 1/00278* (2013.01); *B60H 1/00899*
              (2013.01); *B60H 1/143* (2013.01); *B60H*
              *2001/00307* (2013.01); *B60H 2001/00928*
              (2013.01)
(58) Field of Classification Search
     CPC ............ B60H 1/00278; B60H 1/00899; B60H
                      1/143; B60H 2001/00307; B60H
                      2001/00928
     See application file for complete search history.

(56) References Cited

U.S. PATENT DOCUMENTS

| | | | | |
|---|---|---|---|---|
| 8,899,062 | B2 * | 12/2014 | Kadle | B60H 1/00342 |
| | | | | 62/333 |
| 10,006,339 | B2 * | 6/2018 | Chen | F02M 26/32 |
| 10,259,291 | B2 * | 4/2019 | Aldridge | B60L 58/27 |
| 11,247,528 | B2 * | 2/2022 | Han | F16K 11/072 |
| 11,305,607 | B2 * | 4/2022 | Kim | B60L 58/26 |
| 11,358,435 | B2 * | 6/2022 | Kim | B60H 1/3227 |
| 11,376,921 | B2 * | 7/2022 | Kim | B60H 1/00392 |
| 11,390,141 | B2 * | 7/2022 | Kim | B60H 1/143 |
| 11,413,929 | B2 * | 8/2022 | Kim | B60H 1/03 |
| 11,427,050 | B2 * | 8/2022 | Kim | B60H 1/00485 |

(Continued)

FOREIGN PATENT DOCUMENTS

| | | | | | |
|---|---|---|---|---|---|
| CN | 113858906 | B | * | 6/2025 | ......... B60H 1/00485 |
| DE | 102020131453 | A1 | * | 12/2021 | ........... B60H 1/2221 |

(Continued)

*Primary Examiner* — Ljiljana V. Ciric
(74) *Attorney, Agent, or Firm* — Lempia Summerfield
Katz LLC

(57) ABSTRACT

A heat pump system of a vehicle is provided to adjust a temperature of a battery module by using a single chiller where a refrigerant and a coolant exchange heat, where waste heat of the electrical component and of the battery module are recovered, and where a plurality of coolant flow lines are formed by using a single valve according to a selected mode of the vehicle heat pump system. The heat pump system includes: a valve; a first cooling apparatus; a second cooling apparatus; a third cooling apparatus; a first connection line; a second connection line; and a third connection line. The valve may be configured to operate such that one line among the first line, the second line, the third line, and the first connection line may be connected to another line or the same line, depending on a selected mode among the at least one mode.

17 Claims, 9 Drawing Sheets

(56)                References Cited

U.S. PATENT DOCUMENTS

| | | | | |
|---|---|---|---|---|
| 11,448,334 | B2 * | 9/2022 | Jeong | F16K 11/0856 |
| 11,458,812 | B2 * | 10/2022 | Jeong | B60H 1/00921 |
| 11,505,038 | B2 * | 11/2022 | Kim | B60H 1/00899 |
| 11,529,844 | B2 * | 12/2022 | Kim | B60H 1/00921 |
| 11,639,097 | B2 * | 5/2023 | Favela Tentori | B60K 11/04 |
| | | | | 123/41.09 |
| 11,870,045 | B2 * | 1/2024 | Kim | H01M 10/6569 |
| 11,959,668 | B2 * | 4/2024 | Lee | B60H 1/143 |
| 12,145,425 | B2 * | 11/2024 | Kim | B60H 1/00921 |
| 12,220,966 | B2 * | 2/2025 | Kim | B60H 1/143 |
| 12,281,823 | B2 * | 4/2025 | Jin | B60H 1/00278 |
| 12,311,739 | B2 * | 5/2025 | Kim | B60H 1/32284 |
| 12,337,661 | B2 * | 6/2025 | Jeong | B60H 1/143 |
| 12,427,830 | B2 * | 9/2025 | Jeong | B60H 1/00921 |
| 12,441,157 | B2 * | 10/2025 | Suzuki | B60K 11/02 |
| 2015/0000327 | A1 * | 1/2015 | Kakehashi | H01M 10/625 |
| | | | | 62/434 |
| 2015/0273976 | A1 * | 10/2015 | Enomoto | B60L 3/0046 |
| | | | | 62/243 |
| 2016/0167481 | A1 * | 6/2016 | Makihara | B60H 1/03 |
| | | | | 237/5 |
| 2016/0178253 | A1 * | 6/2016 | Katoh | B60H 1/32284 |
| | | | | 62/185 |
| 2017/0158081 | A1 * | 6/2017 | Kim | B60H 1/00278 |
| 2021/0252942 | A1 * | 8/2021 | Jeong | B60H 1/3213 |
| 2021/0379962 | A1 * | 12/2021 | Kim | B60H 1/005 |
| 2021/0402844 | A1 * | 12/2021 | Kim | B60H 1/00392 |
| 2022/0032736 | A1 * | 2/2022 | Kim | B60H 1/3205 |
| 2022/0048359 | A1 * | 2/2022 | Kim | B60H 1/143 |
| 2022/0052390 | A1 * | 2/2022 | Kim | H01M 10/663 |

| | | | | |
|---|---|---|---|---|
| 2022/0355648 | A1 * | 11/2022 | Kim | B60H 1/143 |
| 2023/0204119 | A1 * | 6/2023 | Oh | F16K 31/041 |
| | | | | 137/625 |
| 2023/0211647 | A1 * | 7/2023 | Jo | B60H 1/3213 |
| | | | | 62/159 |
| 2023/0302873 | A1 * | 9/2023 | Yeon | F16K 11/0856 |
| 2024/0010046 | A1 * | 1/2024 | Kim | B60H 1/00278 |
| 2024/0190211 | A1 * | 6/2024 | Cha | B60H 1/00899 |
| 2024/0246387 | A1 * | 7/2024 | Michikawauchi | |
| | | | | B60H 1/32284 |
| 2024/0246396 | A1 * | 7/2024 | Jeong | B60H 1/00392 |
| 2024/0300289 | A1 * | 9/2024 | Suzuki | B60H 1/00899 |
| 2024/0304900 | A1 * | 9/2024 | Suzuki | B60K 11/085 |
| 2025/0178410 | A1 * | 6/2025 | Yun | B60H 1/00485 |
| 2025/0196579 | A1 * | 6/2025 | Cha | B60H 1/00278 |
| 2025/0229602 | A1 * | 7/2025 | Cha | B60H 1/00907 |
| 2025/0289293 | A1 * | 9/2025 | Jeong | B60H 1/00921 |
| 2025/0300263 | A1 * | 9/2025 | Miyoshi | H01M 10/6568 |
| 2025/0300265 | A1 * | 9/2025 | Miyoshi | B60L 58/24 |
| 2025/0301613 | A1 * | 9/2025 | Miyoshi | B60H 1/32284 |
| 2025/0319737 | A1 * | 10/2025 | Cha | B60H 1/00899 |

FOREIGN PATENT DOCUMENTS

| | | | | | |
|---|---|---|---|---|---|
| DE | 102020134699 | A1 * | 12/2021 | | B60H 1/2221 |
| DE | 102023105296 | A1 * | 2/2024 | | B60H 1/32284 |
| KR | 20200067008 | A * | 6/2020 | | B60H 1/004 |
| KR | 20210038120 | A | 4/2021 | | |
| KR | 20210155525 | A * | 12/2021 | | B60H 1/2221 |
| KR | 20220001670 | A * | 1/2022 | | B60H 1/2221 |
| KR | 20220003351 | A * | 1/2022 | | B60H 1/2221 |
| KR | 20240016595 | A * | 2/2024 | | B60H 1/32284 |

* cited by examiner

HEAT PUMP SYSTEM FOR A VEHICLE

BACKGROUND

(a) Field

The present disclosure relates to a heat pump system for a vehicle. More particularly, the present disclosure relates to a heat pump system for a vehicle capable of adjusting a temperature of a battery module.

(b) Description of the Related Art

Generally, an air conditioning system for a vehicle includes an air conditioner unit circulating a refrigerant in order to heat or cool an interior of the vehicle.

The air conditioner unit is used to maintain the interior of the vehicle at an appropriate temperature regardless of a change in an external temperature. The air conditioning unit is configured to heat or cool the interior of the vehicle by circulating refrigerant discharged from a compressor, while exchanging heat between a condenser and an evaporator. In this process, the refrigerant discharged by driving the compressor passes through the condenser, a receiver drier, an expansion valve, and the evaporator, and the refrigerant is circulated back to the compressor.

In other words, the air conditioner unit lowers a temperature and a humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

In accordance with a continuous increase in interest in energy efficiency and an environmental pollution, the development of an environmentally-friendly vehicle capable of substantially substituting for an internal combustion engine vehicle is desired. The environmentally-friendly vehicle is classified into an electric vehicle driven using a fuel cell or electricity as a power source and a hybrid vehicle driven using an engine and a battery.

In the electric vehicle or the hybrid vehicle among the environmentally-friendly vehicles discussed above, a separate heater is not used unlike an air conditioner of a general vehicle. Additionally, an air conditioner used in the environmentally-friendly vehicle is generally called a heat pump system.

The electric vehicle having the power source of the fuel cell generates driving force by converting chemical reaction energy between oxygen and hydrogen into electrical energy. In this process, heat energy is generated by a chemical reaction in a fuel cell. Therefore, it is desired to secure the performance of the fuel cell to effectively remove generated heat.

In addition, a hybrid vehicle generates driving force by driving a motor using electricity supplied from the fuel cell described above or an electrical battery, together with an engine operated by a general fuel. Therefore, heat generated from the fuel cell, or the battery and the motor should be effectively removed in order to secure performance of the motor.

Therefore, in the hybrid vehicle or the electric vehicle according to the related art, a cooling means, a heat pump system, and a battery cooling system, respectively, should be configured as separate closed circuits so as to prevent heat generation from the motor, an electric component, and the battery including a fuel cell.

Therefore, the size and weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since a battery cooling system for heating or cooling the battery according to a state of the vehicle is separately provided to obtain an optimal performance of the battery, a plurality of valves for selectively interconnecting connections pipes is employed. Thus, noise and vibration due to frequent opening and closing operations of the valves may be introduced into the vehicle interior, thereby deteriorating the ride comfort.

In addition, when heating the vehicle interior, the heating performance may be deteriorated due to the lack of a heat source. Additionally, the electricity consumption may be increased due to the usage of the electric heater, and the power consumption of the compressor may be increased.

In addition, a separate heat-exchanger is additionally desired in order to recollect waste heat from various heat sources in the heating mode of the vehicle, which negatively increases manufacturing costs.

The above information disclosed in this Background section is only to enhance understanding of the background of the present disclosure. Therefore, the background section may contain information that does not form the prior art that is already known to a person having ordinary skill in the art.

SUMMARY

The present disclosure provides a heat pump system for a vehicle capable of enhancing the overall efficiency of the system. This is achieved by adjusting a temperature of a battery module by using a single chiller where a refrigerant and a coolant exchange heat, and by selectively recovering waste heat of the electrical component and the battery module and using the same for heating the vehicle interior.

In addition, the present disclosure provides a heat pump system for a vehicle capable of simplifying a layout of the system and reducing manufacturing costs by forming a plurality of coolant flow lines using a single valve based on a selected mode of the vehicle.

In one embodiment of the present disclosure, a heat pump system of a vehicle includes a valve configured to control flowing movement of a coolant that is interiorly introduced, based on at least one mode for temperature adjustment of a vehicle interior and temperature adjustment of a battery module. The system also includes a first cooling apparatus that includes a first line of which a first end and a second end are connected to the valve to selectively circulate the coolant, a first radiator, and an electrical component. The first radiator and the electrical component are provided on the first line. The system also includes a second cooling apparatus that includes a second line of which a first end and a second end are connected to the valve to selectively circulate the coolant, and the battery module that is provided on the second line. The system also includes a third cooling apparatus that includes a third line of which a first end is connected to the valve to selectively circulate the coolant, wherein the second radiator is provided on the third line. The system also includes: a first connection line of which a first end is connected to the valve to selectively circulate the coolant, and on which a chiller is provided; a second connection line of which a first end is connected to the second line and a second end is connected to the first connection line; and a third connection line of which a first end is connected to a second end of the first connection line and a second end is connected to the first line between the first radiator and the electrical component. The valve is configured to operate such that one line among the first line, the second line, the third line and the first connection line is connected to another line or the same line, depending on a selected mode among the at least one mode.

A first water pump may be provided in the first line between the valve and the electrical component. A second water pump may be provided in the second line between the valve and the battery module.

A second end of the third line may be connected to the second connection line.

The at least one mode may include: a first mode for cooling the electrical component by using a coolant cooled at the first radiator and for increasing a temperature of the battery module; and a second mode for cooling the electrical component by using the coolant cooled at the first radiator and for cooling the battery module by using the coolant cooled at the second radiator. The at least one mode may also include: a third mode for cooling the electrical component by using the coolant cooled at the first radiator and for cooling the battery module by using the coolant having exchanged heat in the chiller; and a fourth mode for heating the vehicle interior and for increasing the temperature of the battery module while recovering waste heat of the electrical component. The at least one mode may also include: a fifth mode for heating the vehicle interior and for recovering waste heat of the electrical component and the battery module; a sixth mode for cooling the electrical component by using the coolant cooled at the first and second radiators and for cooling the battery module by using the coolant having exchanged heat in the chiller; and a seventh mode for cooling the electrical component by using the coolant cooled at the first and second radiators and for increasing a temperature of the battery module.

In the first mode, a first end of the first line may be connected to a second end of the first line by an operation of the valve such that the first line forms an independent closed circuit in order to supply the coolant cooled at the first radiator to the electrical component. The first end of the second line may be connected to a second end of the second line by the operation of the valve such that the second line forms an independent closed circuit. The third line may be closed by the operation of the valve. The first connection line may be closed by the operation of the valve. The second connection line may be closed by the closed first connection line, and the coolant may stop flowing via the third connection line.

In the second mode, the first end of the first line may be connected to the second end of the first line by an operation of the valve such that the first line forms an independent closed circuit in order to supply the coolant cooled at the first radiator to the electrical component. The first end of the third line may be connected to the first end of the second line by the operation of the valve such that the coolant cooled at the second radiator is supplied to the battery module. The second end of the second line may be connected to the first end of the first connection line by the operation of the valve. The second connection line may be opened such that the second line is connected to the third line via the first connection line. The coolant may stop flowing via the third connection line. A partial coolant of the coolant having passed through the battery module may flow into the valve via the second line. A remaining coolant of the coolant having passed through the battery module via the second line may flow via the opened second connection line and flow into the third line together with the coolant discharged to the first connection line.

In the second mode, the first end of the first line may be connected to a second end of the first line by an operation of the valve such that the first line forms an independent closed circuit in order to supply the coolant cooled at the first radiator to the electrical component. The first end of the third line may be connected to the first end of the second line by the operation of the valve such that the coolant cooled at the second radiator is supplied to the battery module. A portion of the second line that connects the valve and the downstream side of the battery module, with reference to the flow direction of the coolant, may be closed by the operation of the valve. A portion of the second connection line may be opened such that the opened second line is connected to the third line. A portion of the second connection line connected to the first connection line and the third connection line may be closed. The coolant may stop flowing via the third connection line. The coolant having passed through the battery module via the second line from the valve may flow into the second radiator along the opened second connection line and the third line connected to the second connection line.

In the third mode, the first end of the first line may be connected to a second end of the first line by an operation of the valve such that the first line forms an independent closed circuit in order to supply the coolant cooled at the first radiator to the electrical component. The first end of the second line may be connected to the first end of the first connection line by the operation of the valve. A portion of the second line that connects the valve and the downstream side of the battery module, with reference to the flow direction of the coolant, may be closed by the operation of the valve. The third line may be closed by the operation of the valve. The second connection line may be opened such that the second line is connected to the first connection line. The coolant may stop flowing via the third connection line. The chiller may exchange heat between the coolant introduced via the first connection line with a refrigerant, and may supply a heat-exchanged low-temperature coolant to battery module.

In the fourth mode, with reference to the flow direction of the coolant, a portion of the first line connecting the first radiator and the downstream side of the electrical component and connecting the first radiator and the valve, may be closed by the operation of the valve. The first end of the first connection line may be connected to the first end of the first line by the operation of the valve. The first line may be connected to the opened first connection line by the third connection line, at the downstream side of the electrical component. The first end of the second line may be connected to the second end of the second line by the operation of the valve such that the second line forms an independent closed circuit. The third line may be closed by the operation of the valve. The second connection line may be closed. The chiller may recollect the waste heat of the electrical component the coolant heated while cooling the electrical component.

In the fifth mode, with reference to the flow direction of the coolant, a portion of the first line connecting the first radiator and a downstream side of the electrical component, and connecting the first radiator and the valve may be closed by an operation of the valve. The second end of the second line may be connected to the opened portion of the first line by the operation of the valve. The third line may be closed by the operation of the valve. The first end of the first connection line may be connected to the first end of the second line by the operation of the valve. The second connection line may be opened to connect the second line and the first connection line. The first line may be connected to the first connection line by the third connection line, the downstream side of the electrical component. The coolant having passed through the electrical component may flow into the first connection line via the third connection line connected to the first line. A partial coolant of the coolant having passed through the battery module via the second line may flow into the valve via the second line. The remaining coolant of the coolant having passed through the battery module via the second line may flow into the first connection line via the opened second connection line. The chiller may recollect the waste heat of the electrical component and the battery module from the coolant heated while cooling the electrical component and the battery module, respectively.

In the sixth mode, the first end of the first line may by connected to the first end of the third line by the operation of the valve such that the coolant cooled at the first and second radiators are supplied to the electrical component. The second end of the first line may be connected to the second end of the second line by the operation of the valve. The first end of the second line may be connected to the first end of the first connection line by the operation of the valve. The second connection line may be opened such that the second line is connected to the first connection line. The second end of the third line may be connected to the second connection line. The coolant may stop flowing via the third connection line. The chiller may exchange heat between the coolant introduced via the first connection line with a refrigerant, and may supply a heat-exchanged low-temperature coolant to the battery module via the second line.

In the seventh mode, the first end of the first line may be connected to the first end of the third line by the operation of the valve such that the coolant cooled at the first and second radiators are supplied to the electrical component. The first end of the first line may be connected to the second end of the first line by the operation of the valve. The first end of the second line may be connected to the second end of the second line by the operation of the valve such that the second line forms an independent closed circuit. The first connection line may be closed by the operation of the valve. A portion of the second connection line connecting the second line and the third line may be closed. A portion of the second connection line may be opened such that the second end of the third line is connected to the third connection line. A partial coolant of the coolant having passed through the electrical component may flow into the first radiator via the first line. The remaining coolant of the coolant having passed through the electrical component may flow into the second radiator via the opened third connection line, a portion of the second connection line, and the third line.

The chiller may be connected to an air conditioner unit via a refrigerant connection line.

The chiller may be a water-cooled heat-exchanger that is configured to exchange heat between the interiorly introduced coolant and a refrigerant supplied from the air conditioner unit.

A coolant heater may be provided in the second line.

For increasing a temperature of the battery module, the coolant heater may be operated such that the coolant supplied to the battery module via the second line may be heated.

The valve may be a 6-Way the valve.

According to a heat pump system for a vehicle according to an embodiment, the overall efficiency of the system may be enhanced by adjusting a temperature of a battery module. This may be achieved by using a single chiller where a refrigerant and a coolant exchange heat, and by selectively recovering waste heat of the electrical component and the battery module and using the same for heating of the vehicle.

In addition, according to the present disclosure, streamlining and simplification of the system may be achieved while reducing manufacturing costs by forming a plurality of coolant flow lines by a single valve according to selected mode of the vehicle.

In addition, according to the present disclosure, as cooling of the electrical components, and independent temperature adjustment of a battery module unrelated to the operation of the air conditioner unit are available. The temperature of the battery module is efficiently adjusted, the optimal performance of the battery module is enabled, and the overall travel distance of vehicle may be increased through the efficient management of the battery module.

In addition, according to an embodiment, it is possible to reduce manufacturing cost and weight through simplification of an entire system, and to improve space utilization.

BRIEF DESCRIPTION OF THE DRAWINGS

These drawings are for reference only in describing embodiments of the present disclosure. Therefore, the technical idea of the present disclosure should not be limited to the accompanying drawings.

DETAILED DESCRIPTION

Figure 1:
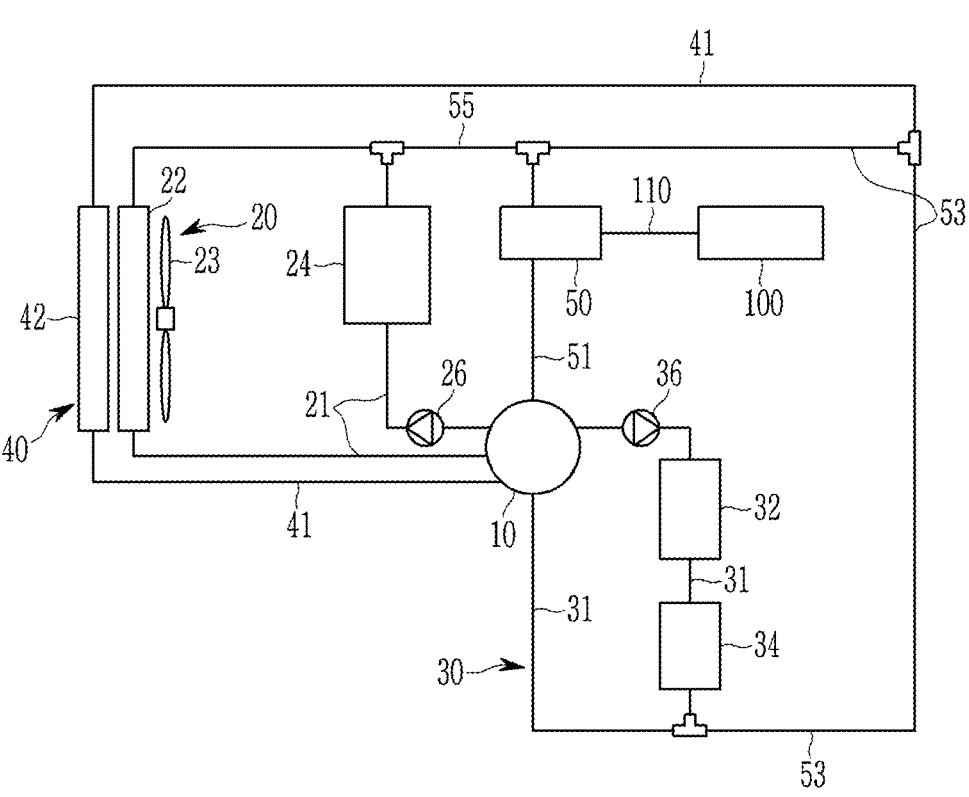
FIG. 1 is a block diagram illustrating a heat pump system for a vehicle according to an embodiment.

The embodiments are hereinafter described in detail with reference to the accompanying drawings.

The embodiments disclosed in the present disclosure and the constructions depicted in the drawings are only some of the embodiments of the present disclosure, and do not cover the entire scope of the present disclosure. Therefore, it should be understood that there may be various equivalents and variations at the time of the application of this present disclosure.

In order to clarify the present disclosure, parts that are not related to the description have been omitted, and the same elements or equivalents are referred to with the same reference numerals throughout the present disclosure.

Also, the size and thickness of each element are arbitrarily shown in the drawings, but the present disclosure is not necessarily limited thereto. Additionally, in the drawings, the thickness of layers, films, panels, regions, and the like, are exaggerated for clarity.

In addition, unless explicitly described to the contrary, the words "comprise" and variations such as "comprises" or "comprising," should be understood to imply the inclusion of stated elements but not the exclusion of any other elements.

Furthermore, each of the terms, such as " . . . unit," " . . . means," " . . . portions," " . . . part," and " . . . member" described in the present disclosure, mean a unit of a comprehensive element that performs at least one function or operation.

When a component, device, element, or the like of the present disclosure is described as having a purpose or performing an operation, function, or the like, the component, device, or element should be considered herein as being "configured to" meet that purpose or perform that operation or function.

FIG. 1 is a block diagram illustrating a heat pump system for a vehicle according to an embodiment.

A heat pump system for a vehicle according to an embodiment may efficiently adjust a temperature of a battery module 32 by using a single chiller 50 where a refrigerant and a coolant exchange heat, and selectively recollect waste heat of an electrical component 24 and the battery module 32 to use the same for heating of the vehicle interior.

In addition, according to the heat pump system, the layout of the system may be simplified, and manufacturing costs may be reduced. This may be achieved by forming a plurality of coolant flow lines by a single valve 10 according to a selected mode of the vehicle.

According to the heat pump system, the electrical component 24 and the battery module 32 through which the coolant circulates may be interconnected with each other through an air conditioner unit 100 and the chiller 50 for circulating the refrigerant in order for cooling and heating the vehicle interior.

In other words, referring to FIG. 1, the heat pump system may include the valve 10, a first cooling apparatus 20, a second cooling apparatus 30, a third cooling apparatus 40, the chiller 50, a first connection line 51, a second connection line 53, and a third connection line 55.

First, the valve 10 may control a flow of the coolant that is interiorly introduced, according to at least one selected mode for temperature adjustment of the vehicle interior and temperature adjustment of the electrical component 24 and the battery module 32.

In the present embodiment, the first cooling apparatus 20 may include a first line 21 of which a first end and a second end are connected to the valve 10 to selectively circulate the coolant. Additionally, the first cooling apparatus 20 may include a first radiator 22 and the electrical component 24 provided on the first line 21.

The first radiator 22 may be disposed in the front of the vehicle, and a cooling fan 23 may be provided at a downstream side of the radiator 22. Accordingly, the first radiator 22 cools the coolant through an operation of the cooling fan 23 and exchanges heat with the ambient air.

In addition, a first water pump 26 may be provided in the first line 21 between the valve 10 and the electrical component 24.

The second cooling apparatus 30 may include a second line 31 of which a first end and a second end are connected to the valve 10 to selectively circulate the coolant, and the battery module 32 provided on the second line 31.

A second water pump 36 may be provided in the second line 31 between the valve 10 and the battery module 32.

The first water pump 26 and the second water pump 36 may be an electric water pump.

In the present embodiment, a coolant heater 34 may be provided in the second line 31.

In more detail, the coolant heater 34 may be positioned in the second line 31 at a downstream side of the battery module 32, with reference to a flow direction of the coolant.

For increasing a temperature of the battery module 32, the coolant heater 34 may be operated to heat the coolant supplied to the battery module 32 along the second line 31.

The coolant heater 34 may be an electrical heater operated by a supply of power.

In other words, the coolant heater 34 may be operated when a temperature of the coolant supplied to the battery module 32 is lower than a target temperature to heat the coolant flowing through the second line 31.

Accordingly, the coolant heated while passing through the coolant heater 34 may be supplied to the battery module 32 along the second line 31 by an operation of the valve 10, and may increase the temperature of the battery module 32.

Therefore, the coolant heater 34 may be selectively operated to increase the temperature of the battery module 32.

In the present embodiment, the third cooling apparatus 40 may include a third line 41 of which a first end is connected to the valve 10 to selectively circulate a coolant, and a second radiator 42 provided on the third line 41.

The second radiator 42 may be disposed in the front of the first radiator 22. Accordingly, the second radiator 42 cools the coolant through an operation of the cooling fan 23 and exchanges heat with an ambient air.

In the present embodiment, a first end of the first connection line 51 may be connected to the valve 10 to selectively circulate the coolant. The chiller 50 may be provided in the first connection line 51.

The chiller 50 may be connected to the air conditioner unit 100 through a refrigerant connection line 110 such that the refrigerant is supplied from the air conditioner unit 100.

The chiller 50 may be a water-cooled heat-exchanger that exchanges heat between the interiorly introduced coolant and the refrigerant supplied from the air conditioner unit 100.

The chiller 50 may adjust the temperature of the coolant by exchanging heat between the selectively supplied coolant and the refrigerant selectively supplied from the air conditioner unit 100.

The chiller 50 may be operated, when cooling the battery module 32 by using the coolant having exchanged heat with the refrigerant supplied from the air conditioner unit 100, or when recovering heat from the coolant heated by the waste heat of the electrical component 24 and the battery module 32, selectively, for heating of the vehicle interior.

In the present embodiment, a first end of the second connection line 53 may be connected to the second line 31.

The first end of the second connection line 53 is connected to the second line 31 at the downstream side of the battery module 32, with reference to the flow direction of the coolant flowing along the second line 31.

A second end of the second connection line 53 may be connected to a second end of the first connection line 51. In addition, a second end of the third line 41 may be connected to the second connection line 53.

In addition, a first end of the third connection line 55 may be connected to the second end of the first connection line 51. A second end of the third connection line 55 may be connected to the first line 21 between the first radiator 22 and the electrical component 24.

The third connection line 55 may always maintain an opened state in the at least one mode.

The third connection line 55 may selective flow the coolant depending on the connection structure of the first line 21, the second line 31, the third line 41, and the first connection line 51 according to the operation of the valve 10.

The valve 10 may operate such that one line among the first line 21, the second line 31, the third line 41, and the first connection line 51 is connected to another line or the same line, depending on a selected mode among the at least one mode.

The valve 10 may be a 6-Way valve provided with six ports through which the coolant is drawn and discharged.

The at least one mode may include first, second, third, fourth, fifth, sixth, and seventh modes.

First, in the first mode, the electrical component 24 may be cooled by using the coolant cooled at the first radiator 22, and the temperature of the battery module 32 may be increased.

In the second mode, the electrical component 24 may be cooled by using the coolant cooled at the first radiator 22, and the battery module 32 may be cooled by using the coolant cooled at the second radiator 42.

In the third mode, the electrical component 24 may be cooled by using the coolant cooled at the first radiator 22, and the battery module 32 may be cooled by using the coolant having exchanged heat in the chiller 50.

In the fourth mode, the vehicle interior may be heated, and while recovering the waste heat of the electrical component 24, the temperature of the battery module 32 may be increased.

In the fifth mode, the vehicle interior may be heated, and the waste heat of the electrical component 24 and the battery module 32 may be recovered.

In the sixth mode, the electrical component 24 may be cooled by using the coolant cooled at the first radiator 22 and the second radiator 42, and the battery module 32 may be cooled by using the coolant having exchanged heat in the chiller 50.

In the seventh mode, the electrical component 24 may be cooled by using the coolant cooled at the first radiator 22 and the second radiator 42, and the temperature of the battery module 32 may be increased.

Hereinafter, operation and action in each mode of a heat pump system for a vehicle according to an embodiment configured as described above is described in detail with reference to FIGS. 2-9.

First, an operation in the first mode of a heat pump system for a vehicle according to an embodiment, for cooling the electrical component 24 by using the coolant cooled at the first radiator 22, and for increasing the temperature of the battery module 32, is described with reference to FIG. 2.

Figure 2:
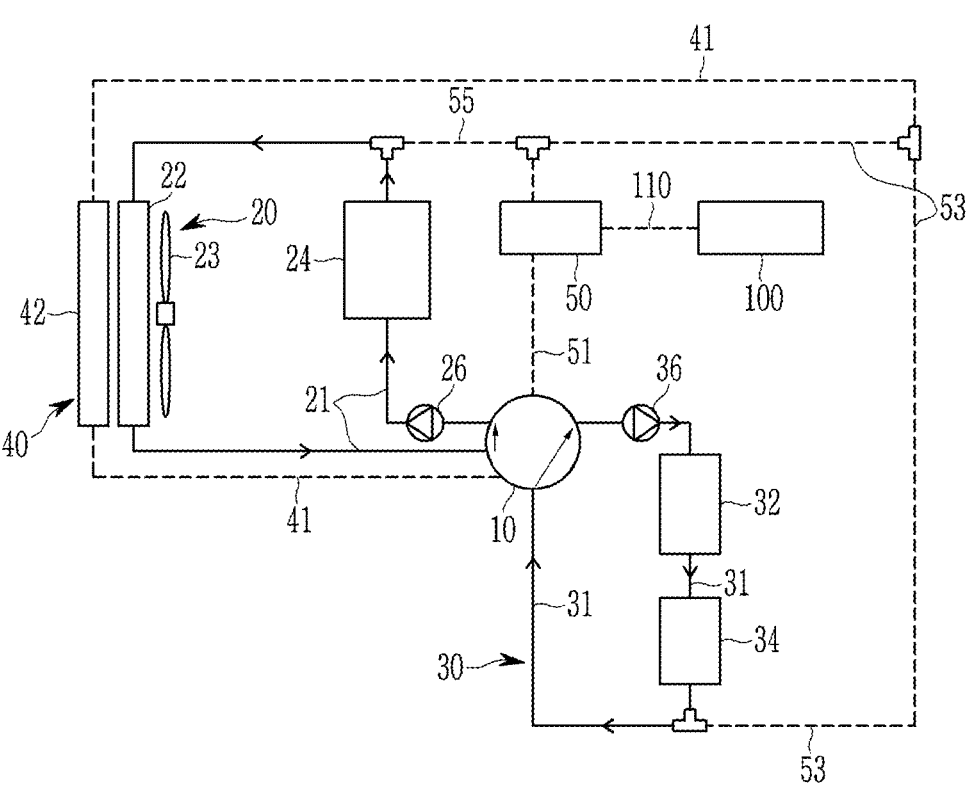
FIG. 2 is an operation diagram illustrating a first mode of a heat pump system for a vehicle according to an embodiment.

FIG. 2 is an operation diagram of the first mode of a heat pump system of a vehicle according to an embodiment.

Referring to FIG. 2, in the first mode, the valve 10 may operate such that the first line 21 forms an independent closed circuit in order to supply the coolant cooled at the first radiator 22 to the electrical component 24.

Then, the first end of the first line 21 may be connected to a second end of the first line 21 by the operation of the valve 10.

Simultaneously, a first end of the second line 31 may be connected to a second end of the second line 31 by the operation of the valve 10, such that the second line 31 forms an independent closed circuit.

The third line 41 may be closed by the operation of the valve 10. In addition, the first connection line 51 may be closed by the operation of the valve 10.

In addition, the second connection line 53 may be closed by the closed first connection line 51.

In addition, the third connection line 55 may maintain the opened state. However, as the first connection line 51 is closed, the coolant may stop flowing through the third connection line 55.

Accordingly, the first line 21 and the second line 31 may form an independent closed circuit for the circulation of the coolant, respectively.

The air conditioner unit 100 may stop operating.

In such a state, when the first water pump 26 is operated, the coolant cooled at the first radiator 22 is drawn into the valve 10 along the first line 21, and then discharged through the first line 21.

In other words, the coolant discharged to the first line 21 may efficiently cool the electrical component 24 while passing through the electrical component 24.

In addition, the coolant having cooled the electrical component 24 flows back into the first radiator 22 along the first line 21. The coolant introduced into the first radiator 22 may be cooled exchanging heat with the ambient air.

The second water pump 36 may be operated to circulate the coolant along the second line 31.

When the second water pump 36 is operated, the coolant may be circulated along the second line 31.

In other words, the coolant discharged from the valve 10 to the second line 31 sequentially passes through the battery module 32 and the coolant heater 34, and then flows back into the valve 10, to circulate along the valve 10 and the second line 31.

The coolant heater 34 may efficiently increase the temperature of the battery module 32 by heating the coolant circulating along the second line 31.

In other words, by repeatedly performing the above-described processes, the coolant cooled at the first radiator 22 may be cooled to prevent the electrical component 24 from overheating.

In addition, in the first mode, the temperature of the battery module 32 may be efficiently adjusted by operating the coolant heater 34 provided on the second line 31.

In the present embodiment, an operation in the second mode, for cooling the electrical component 24 by using the coolant cooled at the first radiator 22, and for cooling the battery module 32 by using the coolant cooled at the second radiator 42, is described with reference to FIG. 3.

Figure 3:
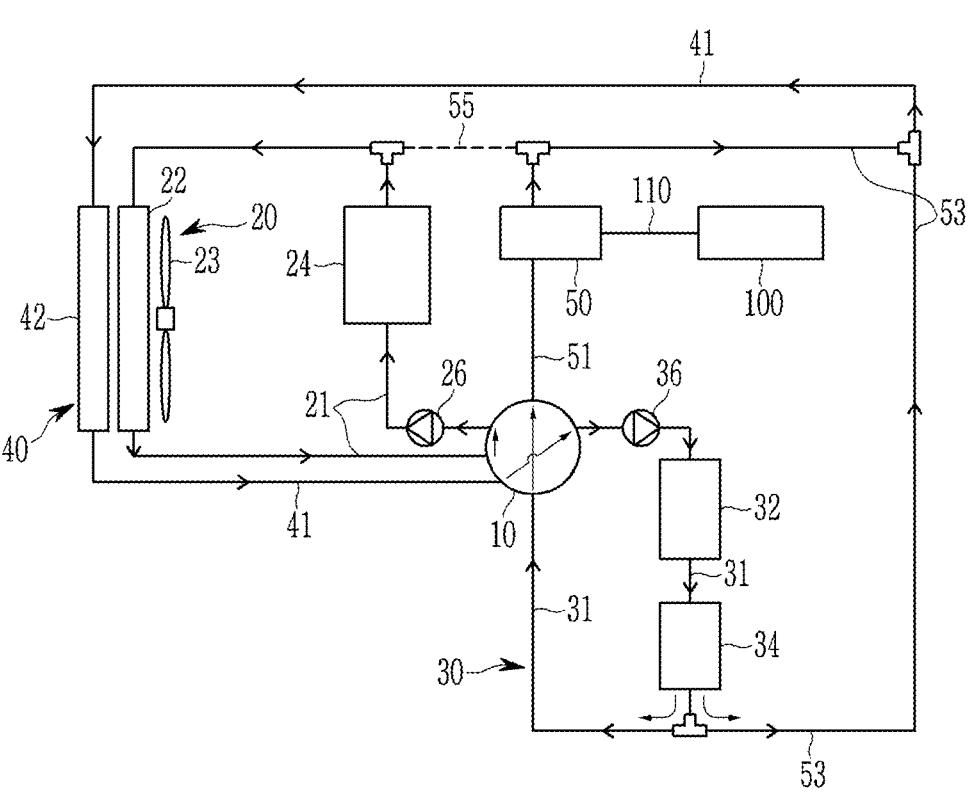
FIG. 3 is an operation diagram illustrating a second mode of a heat pump system for a vehicle according to an embodiment.

FIG. 3 is an operation diagram of the second mode of a heat pump system of a vehicle according to an embodiment.

Referring to FIG. 3, in the second mode, the valve 10 may operate such that the first line 21 forms an independent closed circuit in order to supply the coolant cooled at the first radiator 22 to the electrical component 24.

In other words, a first end of the first line 21 may be connected to a second end of the first line 21 by the operation of the valve 10.

Simultaneously, a first end of the third line 41 may be connected to the first end of the second line 31 by the operation of the valve 10 such that the coolant cooled at the second radiator 42 is supplied to the battery module 32.

The second end of the second line 31 may be connected to the first connection line 51 by the operation of the valve 10.

The second connection line 53 may be opened such that the second line 31 is connected to the third line 41 through the first connection line 51.

The third connection line 55 may maintain the opened state. However, as the first line 21 forms an independent closed circuit and the second line 31, the third line 41, the first connection line 51, and the second connection line 53 form an independent closed circuit, the coolant may stop flowing through the third connection line 55.

In other words, during the initial circulation of the coolant, a flow of coolant may occur at both ends of the third connection line 55 due to a pressure difference between the first line 21 and the second connection line 53. However, after a certain period of time, a pressure balance occurs at both ends of the third connection line 55, and the flow of coolant through the third connection line 55 is stopped.

The air conditioner unit 100 may close the refrigerant connection line 110 such that the refrigerant is not supplied to the chiller 50.

In such a state, when the first water pump 26 is operated, the coolant cooled at the first radiator 22 is drawn into the valve 10 along the first line 21, and then discharged to the first line 21.

In other words, the coolant discharged to the first line 21 may efficiently cool the electrical component 24 while passing through the electrical component 24.

In addition, the coolant having cooled the electrical component 24 flows back into the first radiator 22 along the first line 21. The coolant introduced into the first radiator 22 may be cooled by exchanging heat with the ambient air.

Simultaneously, when the second water pump 36 is operated, the coolant cooled at the second radiator 42 is drawn into the valve 10 through the third line 41, and then discharged to the second line 31.

The coolant discharged to the second line 31 may efficiently cool the battery module 32 while passing through the battery module 32.

Then, a partial coolant of the coolant having passed through the battery module 32 may flow into the valve 10 along the second line 31.

The coolant drawn into the valve 10 along the second line 31 may be discharged to the first connection line 51 to pass through the chiller 50. The coolant having passed through the chiller 50 may flow into the third line 41 along the opened second connection line 53.

The remaining coolant of the coolant having passed through the battery module 32 along the second line 31 may flow along the opened second connection line 53 and may flow into the third line 41 together with the coolant flowing in from the first connection line 51.

The coolant drawn into the third line 41 may be cooled by exchanging heat with the ambient air while passing through the second radiator 42.

In the second mode, the electrical component 24 may be cooled by using the coolant cooled at the first radiator 22, and the battery module 32 may be cooled by using the coolant cooled at the second radiator 42.

In another embodiment, an operation in the second mode, for cooling the electrical component 24 by using the coolant cooled at the first radiator 22, and for cooling the battery module 32 by using the coolant cooled at the second radiator 42, is described with reference to FIG. 4.

Figure 4:
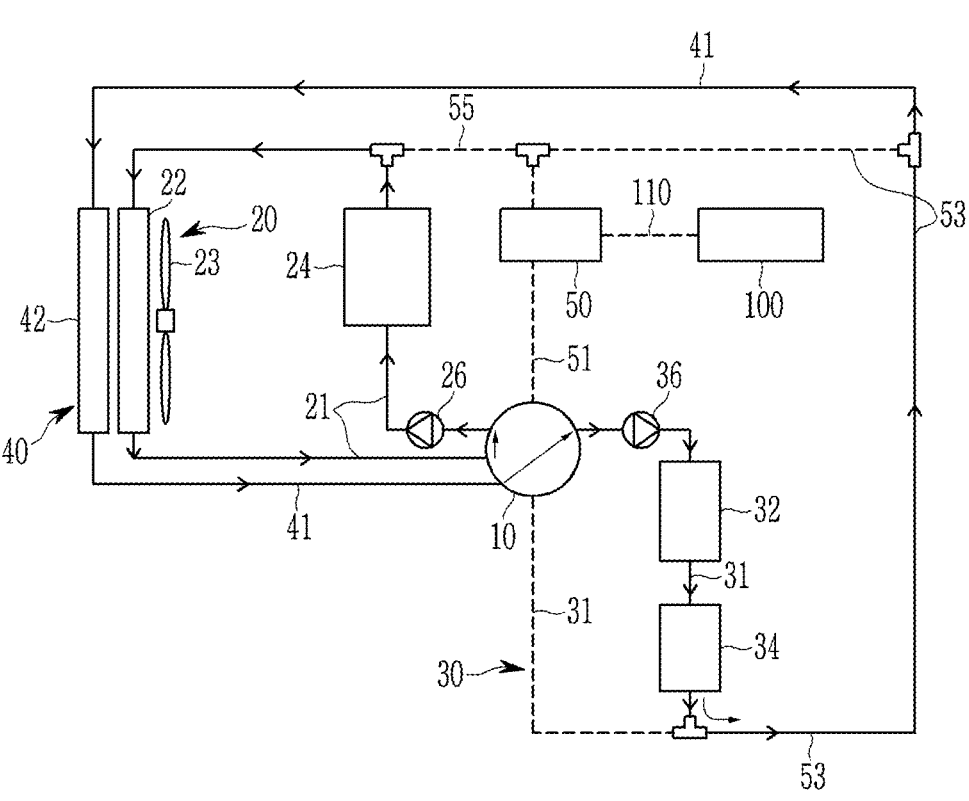
FIG. 4 is another operation diagram illustrating a second mode of a heat pump system for a vehicle according to an embodiment.

FIG. 4 is another operation diagram of the second mode of a heat pump system of a vehicle according to an embodiment.

Referring to FIG. 4, in the second mode, the valve 10 may operate such that the first line 21 forms an independent closed circuit in order to supply the coolant cooled at the first radiator 22 to the electrical component 24.

A first end of the first line 21 may be connected to a second end of the first line 21 by the operation of the valve 10.

Simultaneously, a first end of the third line 41 may be connected to the first end of the second line 31 by the operation of the valve 10 such that the coolant cooled at the second radiator 42 is supplied to the battery module 32.

With reference to the flow direction of the coolant, a portion of the second line 31 that connects the valve 10 and the downstream side of the battery module 32 may be closed by the operation of the valve 10.

In addition, a portion of the second connection line 53 may be opened such that the opened second line 31 is connected to the third line 41.

A portion of the second connection line 53 connected to the first connection line 51 and the third connection line 55 is closed.

The third connection line 55 may maintain the opened state. However, as the first line 21 forms an independent closed circuit and the second line 31, the third line 41, the first connection line 51, and the second connection line 53 form an independent closed circuit, the coolant may stop flowing through the third connection line 55.

In other words, during the initial circulation of the coolant, a flow of coolant may occur at both ends of the third connection line 55 due to a pressure difference between the first line 21 and the second connection line 53. However, after a certain period of time, a pressure balance occurs at both ends of the third connection line 55, and the flow of coolant through the third connection line 55 is stopped.

The air conditioner unit 100 may close the refrigerant connection line 110 such that the refrigerant is not supplied to the chiller 50.

In such a state, when the first water pump 26 is operated, the coolant cooled at the first radiator 22 is drawn into the valve 10 along the first line 21, and then discharged to the first line 21.

In other words, the coolant discharged to the first line 21 may efficiently cool the electrical component 24 while passing through the electrical component 24.

In addition, the coolant having cooled the electrical component 24 flows back into the first radiator 22 along the first line 21. The coolant introduced into the first radiator 22 may be cooled by exchanging heat with the ambient air.

Simultaneously, when the second water pump 36 is operated, the coolant cooled at the second radiator 42 is drawn into the valve 10 through the third line 41, and then discharged to the second line 31.

The coolant discharged to the second line 31 may efficiently cool the battery module 32 while passing through the battery module 32.

Then, the coolant having passed through the battery module 32 flows along the opened portion of the second connection line 53, and may flow into the third line 41 connected to the second connection line 53.

The coolant drawn into the third line 41 may be cooled by exchanging heat with the ambient air while passing through the second radiator 42.

In other words, in the second mode according to another embodiment of the present disclosure, the electrical component 24 may be cooled by using the coolant cooled at the first radiator 22, and the battery module 32 may be cooled by using the coolant cooled at the second radiator 42.

In the present embodiment, an operation in the third mode for cooling the electrical component 24 by using the coolant cooled at the first radiator 22, and for cooling the battery module 32 by using the coolant having exchanged heat in the chiller 50, is described with reference to FIG. 5.

Figure 5:
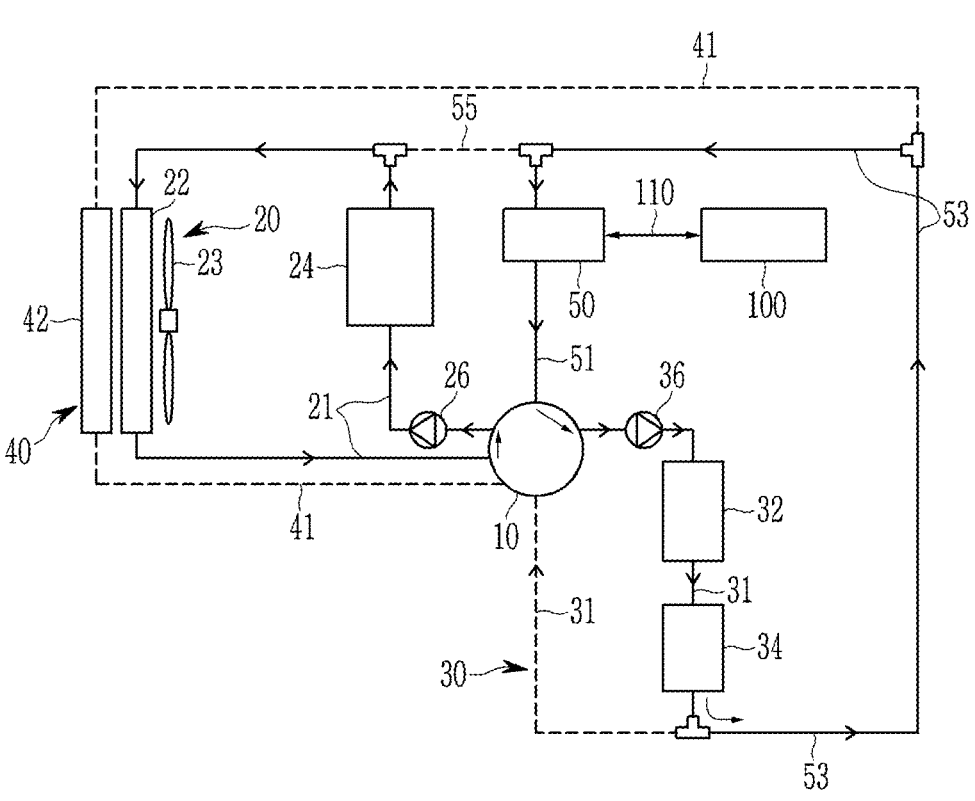
FIG. 5 is an operation diagram illustrating a third mode of a heat pump system for a vehicle according to an embodiment.

FIG. 5 is an operation diagram of a third mode of a heat pump system of a vehicle according to an embodiment.

Referring to FIG. 5, in the third mode, the valve 10 may operate such that the first line 21 forms an independent closed circuit in order to supply the coolant cooled at the first radiator 22 to the electrical component 24.

Then, a first end of the first line 21 may be connected to a second end of the first line 21 by the operation of the valve 10.

Simultaneously, the first end of the second line 31 may be connected to the first end of the first connection line 51 by the operation of the valve 10.

In addition, with reference to the flow direction of the coolant, a portion of the second line 31 that connects the valve 10 and the downstream side of the battery module 32 may be closed by the operation of the valve 10.

The third line 41 is closed by the operation of the valve 10. The second connection line 53 may be opened such that the second line 31 is connected to the first connection line 51.

The third connection line 55 may maintain the opened state. However, as the first line 21 forms an independent closed circuit and the portion of the second line 31, the first connection line 51, and the second connection line 53 form an independent closed circuit, the coolant may stop flowing through the third connection line 55.

In other words, during the initial circulation of the coolant, a flow of coolant may occur at both ends of the third connection line 55 due to a pressure difference between the first line 21 and the second connection line 53. However, after a certain period of time, a pressure balance occurs at both ends of the third connection line 55, and the flow of coolant through the third connection line 55 is stopped.

The air conditioner unit 100 may be operated to supply the refrigerant to the chiller 50. In other words, the air conditioner unit 100 may open the refrigerant connection line 110 so that low-temperature refrigerant is supplied to the chiller 50.

Accordingly, the low-temperature refrigerant is supplied to the chiller 50 from the air conditioner unit 100 through refrigerant connection line 110.

In such a state, when the first water pump 26 is operated, the coolant cooled at the first radiator 22 is drawn into the valve 10 along the first line 21, and then discharged through the first line 21.

In other words, the coolant discharged to the first line 21 may efficiently cool the electrical component 24 while passing through the electrical component 24.

Simultaneously, when the second water pump 36 is operated, the coolant discharged to the second line 31 passes through the battery module 32, and then flows along the second connection line 53 connected to the opened second line 31.

The coolant having flowed to the second connection line 53 may flow into the first connection line 51 and pass through the chiller 50.

The chiller 50 may cool the coolant introduced through the first connection line 51 by exchanging heat with the low-temperature refrigerant supplied from the air conditioner unit 100.

Accordingly, the low temperature coolant cooled in the chiller 50 flows into the valve 10 along the first connection line 51. Then, the low temperature coolant is supplied to the battery module 32 along the second line 31, thereby efficiently cooling the battery module 32.

In the third mode, by repeatedly performing the above-described processes, the electrical component 24 may be efficiently cooled by using the coolant cooled at the first radiator 22, and the battery module 32 may be efficiently cooled by using the coolant cooled at the chiller 50.

In the present embodiment, an operation in the fourth mode, for heating the vehicle interior and for increasing the temperature of the battery module 32 while recovering the waste heat of the electrical component 24, is described with reference to FIG. 6.

Figure 6:
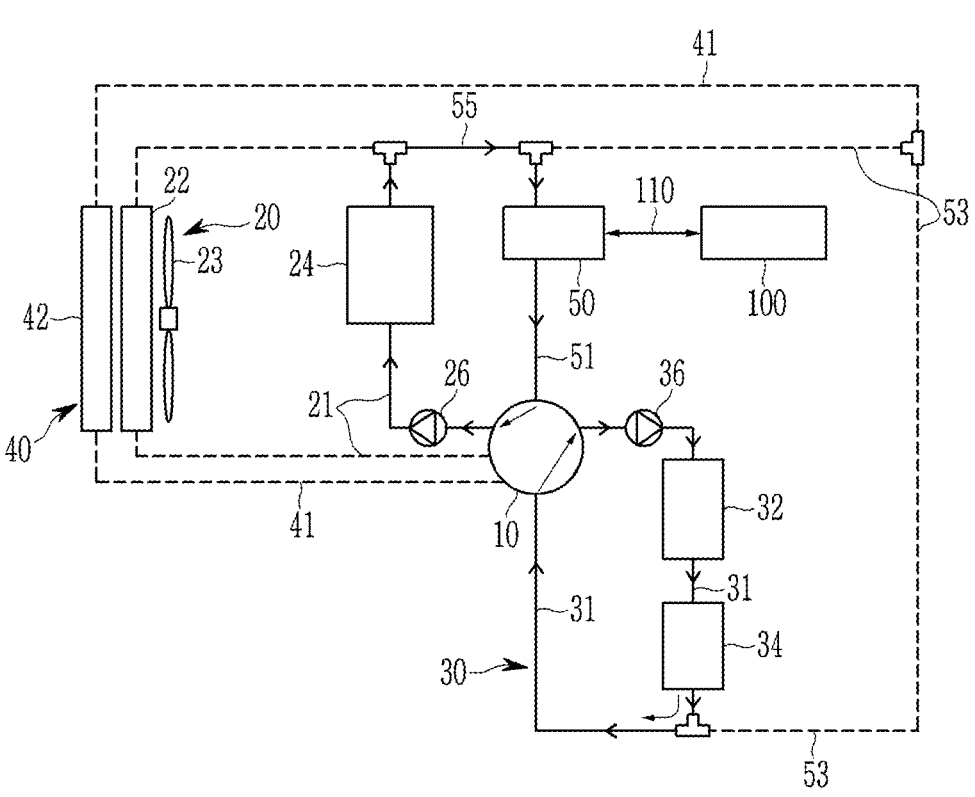
FIG. 6 is an operation diagram illustrating a fourth mode of a heat pump system for a vehicle according to an embodiment.

FIG. 6 is an operation diagram of a fourth mode of a heat pump system of a vehicle according to an embodiment.

Referring to FIG. 6, with reference to the flow direction of the coolant, a portion of the first line 21 connecting the first radiator 22 and the downstream side of the electrical component 24, and connecting the first radiator 22 and the valve 10 may be closed by the operation of the valve 10.

Simultaneously, the first end of the first connection line 51 may be connected to the first end of the first line 21 that is opened by the operation of the valve 10.

In addition, the first line 21 may be connected to the opened first connection line 51 by the third connection line 55, at the downstream side of the electrical component 24.

Simultaneously, the first end of the second line 31 may be connected to the second end of the second line 31 by the operation of the valve 10 such that the second line 31 forms an independent closed circuit.

The third line 41 may be closed by the operation of the valve 10. In addition, the second connection line 53 may be closed as the second line 31 forms an independent closed circuit.

In such a state, when the first water pump 26 is operated, the coolant discharged from the valve 10 to the first line 21 may cool the electrical component 24 while passing through the electrical component 24.

The coolant having cooled the electrical component 24 may flow into the first connection line 51 along the opened third connection line 55.

The coolant drawn into the first connection line 51 may pass through the chiller 50, and then flow into the valve 10. Then, the coolant drawn into the valve 10 along the first connection line 51 may be again discharged to the first line 21 connected to the electrical component 24.

The air conditioner unit 100 may be operated in order to heat the vehicle interior.

In other words, the air conditioner unit 100 may operate such that the refrigerant may be supplied to the chiller 50 through the refrigerant connection line 110.

Accordingly, the chiller 50 may recollect the waste heat of the electrical component 24 from the coolant heated while cooling the electrical component 24.

In more detail, the coolant having increased temperature by absorbing the waste heat of the electrical component 24 passes through the chiller 50 along the first connection line 51, and is recovered while heating the refrigerant supplied to the chiller 50.

Through such an operation, the chiller 50 may heat the refrigerant by exchanging heat between the coolant and the refrigerant in order to recollect waste heat from the coolant heated while passing through the electrical component 24. The heated refrigerant may be supplied back to the air conditioner unit 100.

As such, by repeatedly performing the above-described processes, the chiller 50 may smoothly recollect the waste heat of the electrical component 24 and use the same for heating the vehicle interior.

The second water pump 36 may be operated to circulate the coolant along the second line 31.

When the second water pump 36 is operated, the coolant may be circulated along the second line 31.

In other words, the coolant discharged from the valve 10 to the second line 31 sequentially passes through the battery module 32 and the coolant heater 34, and then flows back into the valve 10, to circulate along the valve 10 and the second line 31.

The coolant heater 34 may efficiently increase the temperature of the battery module 32 by heating the coolant circulating along the second line 31.

In other words, in the third mode, by absorbing the waste heat of the electrical component 24 at the chiller 50 and using it to increase the temperature of the refrigerant, a power consumption of the compressor provided in the air conditioner unit 100 may be decreased, and a heating efficiency thereof may be enhanced.

Additionally, in the fourth mode, by operating the coolant heater 34 provided in the second line 31, the temperature of the coolant circulating along the second line 31 may be quickly raised and supplied to the battery module 32, and the temperature of the battery module 32 may be efficiently adjusted.

In the present embodiment, an operation in the fifth mode of the heat pump system, for heating the vehicle interior and for recovering the waste heat of the electrical component 24 and the battery module 32, is described with reference to FIG. 7.

Figure 7:
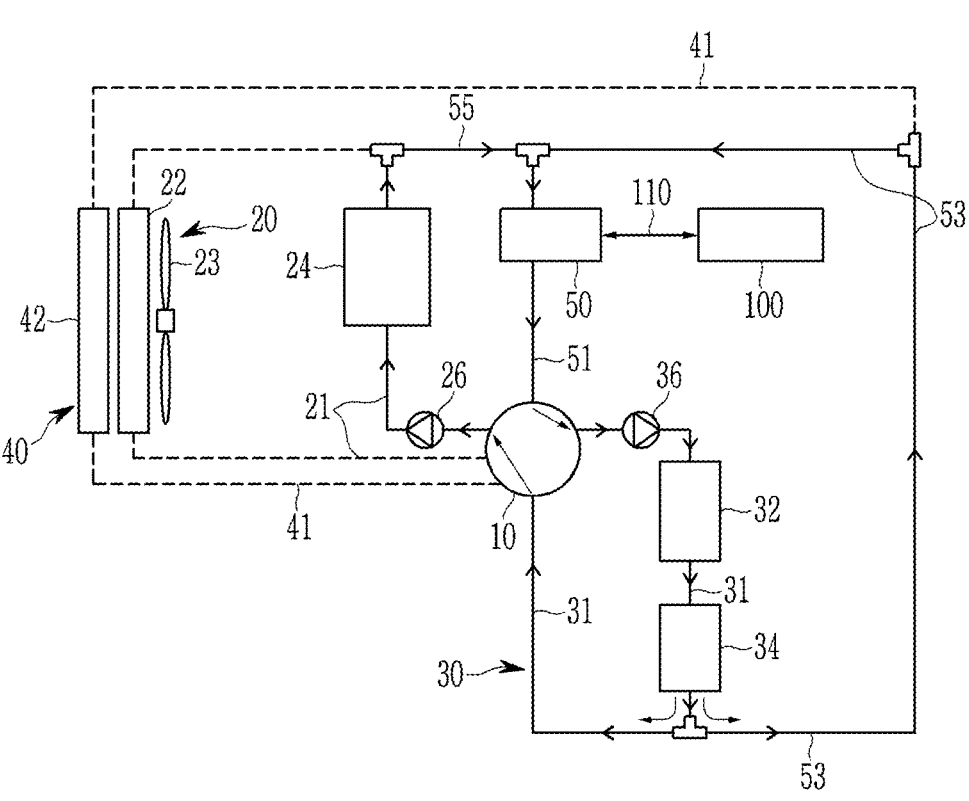
FIG. 7 is an operation diagram illustrating a fifth mode of a heat pump system for a vehicle according to an embodiment.

FIG. 7 is an operation diagram of a fifth mode of a heat pump system of a vehicle according to an embodiment.

Referring to FIG. 7, in the fifth mode, with reference to the flow direction of the coolant, the portion of the first line 21 connecting the first radiator 22 and the downstream side of the electrical component 24, and connecting the first radiator 22 and the valve 10 may be closed by the operation of the valve 10.

The second end of the second line 31 may be connected to the portion of the first line 21 that is opened by the operation of the valve 10.

The third line 41 may be closed by the operation of the valve 10. In addition, the first end of the first connection line 51 may be connected to the first end of the second line 31 by the operation of the valve 10.

The second connection line 53 may be opened to connect the second line 31 and the first connection line 51.

In addition, the first line 21 may be connected to the opened first connection line 51 by the third connection line 55, at the downstream side of the electrical component 24.

In such a state, when the first and second water pumps 26 and 36 are operated, the coolant having passed through the electrical component 24 may flow into the first connection line 51 along the third connection line 55 connected to the first line 21.

The coolant discharged from the valve 10 to the first line 21 may cool the electrical component 24 while passing through the electrical component 24.

In other words, the coolant having cooled the electrical component 24 may flow into the first connection line 51 along the opened third connection line 55.

Simultaneously, the coolant discharged from the valve 10 to the second line 31 may cool the battery module 32 while passing through the battery module 32 along the second line 31.

Then, a partial coolant of the coolant having passed through the battery module 32 may flow into the valve 10 along the second line 31.

The coolant drawn into the valve 10 along the second line 31 may be discharged to the first line 21 to pass through the electrical component 24.

The remaining coolant of the coolant having passed through the battery module 32 along the second line 31 may flow into the first connection line 51 along the opened second connection line 53.

In other words, the coolant heated while cooling the electrical component 24 and the battery module 32 respectively may flow into the first connection line 51.

Each coolant flowing into the first connection line 51 may pass through the chiller 50, and then flow into the valve 10.

Then, the coolant drawn into the valve 10 along the first connection line 51 may be again discharged to the second line 31 connected to the battery module 32, and the above-described operation may be repetitively performed.

The air conditioner unit 100 may be operated in order to heat the vehicle interior.

In other words, the air conditioner unit 100 may operate such that the refrigerant may be supplied to the chiller 50 through the refrigerant connection line 110.

Accordingly, the chiller 50 may recollect the waste heat of the electrical component 24 and the battery module 32 from the coolant heated while cooling the electrical component 24 and the battery module 32, respectively.

In more detail, the coolant heated by absorbing the waste heat of both the electrical component 24 and the battery module 32 increases the temperature of the refrigerant supplied to the chiller 50 while passing through the chiller 50 along the first connection line 51.

Through such an operation, the chiller 50 may heat the refrigerant by exchanging heat between the coolant and the refrigerant in order to recollect waste heat from the coolant heated while passing through the electrical component 24 and the battery module 32. The heated refrigerant may be supplied back to the air conditioner unit 100.

As such, by repeatedly performing the above-described processes, the chiller 50 may smoothly recollect the waste heat of the electrical component 24 and the battery module 32 and use the same for heating the vehicle interior.

In other words, in the fifth mode, by absorbing the waste heat of the electrical component 24 and the waste heat of the battery module 32 at the chiller 50 and using it to heat the refrigerant, a power consumption of the compressor provided in the air conditioner unit 100 may be decreased, and a heating efficiency thereof may be enhanced.

An operation in the sixth mode of the heat pump system is described with reference to FIG. 8. In the sixth mode, the electrical component 24 is cooled by using the coolant cooled at the first and second radiators 22 and 42, and the battery module 32 is cooled by using the coolant having exchanged heat in the chiller 50.

Figure 8:
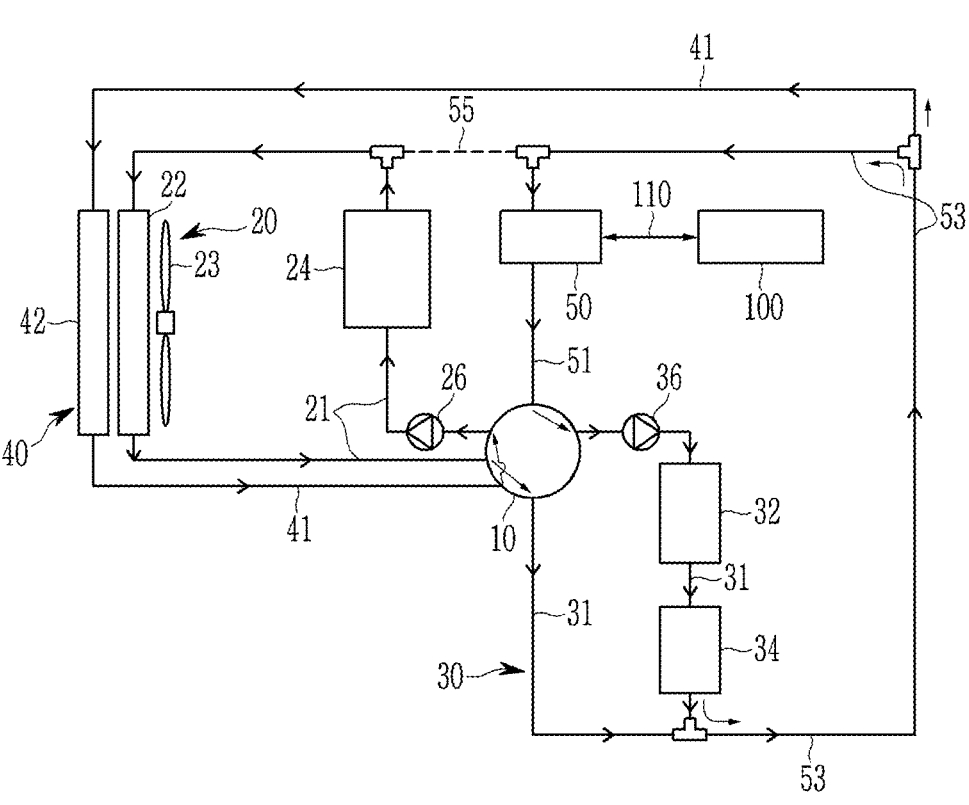
FIG. 8 is an operation diagram illustrating a sixth mode of a heat pump system for a vehicle according to an embodiment.

FIG. 8 is an operation diagram of a sixth mode of a heat pump system of a vehicle according to an embodiment.

Referring to FIG. 8, in the sixth mode, the first end of the first line 21 may be connected to the first end of the third line 41 by the operation of the valve 10 such that the coolant cooled at the first and second radiators 22 and 42 are supplied to the electrical component 24.

Simultaneously, the second end of the first line 21 may be connected to the second end of second line 31 by the operation of the valve 10.

In addition, the first end of the second line 31 may be connected to the first connection line 51 by the operation of the valve 10.

The second connection line 53 may be opened so that the second line 31 is connected to the first connection line 51.

The second end of the third line 41 may be connected to the second connection line 53.

The coolant may stop flowing through the third connection line 55.

In other words, during the initial circulation of the coolant, a flow of coolant may occur at both ends of the third connection line 55 due to a pressure difference between the first line 21 and the second connection line 53. However, after a certain period of time, a pressure balance occurs at both ends of the third connection line 55, and the flow of coolant through the third connection line 55 is stopped.

The air conditioner unit 100 may be operated to supply the refrigerant to the chiller 50. In other words, the air conditioner unit 100 may open the refrigerant connection line 110 so that low-temperature refrigerant is supplied to the chiller 50.

Accordingly, the low-temperature refrigerant is supplied to the chiller 50 from the air conditioner unit 100 through the refrigerant connection line 110.

In such a state, when the first water pump 26 is operated, the coolant cooled at the first radiator 22 is drawn into the valve 10 along the first line 21, and then discharged through the second end of the second line 31.

The coolant discharged to the second end of the second line 31 is flowed along the second connection line 53. A partial coolant of the coolant flowed into the second connection line 53 flows into the first connection line 51, and the remaining coolant of the coolant may flow into the second radiator 42 along the third line 41.

The coolant drawn into the second radiator 42 may be cooled by exchanging heat with the ambient air, and then flowed into the valve 10 along the third line 41.

The coolant drawn into the valve 10 may pass through the electrical component 24 along the first line 21 connected to the first end of the third line 41 by the operation of the valve 10.

In other words, the coolant cooled at the first and second radiators 22 and 42 may cool the electrical component 24 more efficiently while repeatedly performing the above-described operation.

Simultaneously, when the second water pump 36 is operated, the coolant discharged to the second line 31 passes through the battery module 32, and then flows along the second connection line 53 connected to the opened second line 31.

The coolant passing through the battery module 32 may flow into the second connection line 53 together with the coolant flowing from the first radiator 22 along the first and second lines 21 and 31.

A partial coolant of the coolant drawn into the second connection line 53 may flow into the first connection line 51 and pass through the chiller 50.

The chiller 50 may cool the coolant introduced through the first connection line 51 by exchanging heat between the low-temperature refrigerant supplied from the air conditioner unit 100.

Accordingly, the low temperature coolant cooled in the chiller 50 flows into the valve 10 along the first connection line 51. Then, the low temperature coolant is supplied to the battery module 32 along the second line 31, thereby efficiently cooling the battery module 32.

In other words, in the sixth mode, by repeatedly performing the above-described processes, the electrical component 24 may be efficiently cooled by using the coolant cooled at the first and second radiators 22 and 42, and the battery module 32 may be efficiently cooled by using the coolant cooled at the chiller 50.

In addition, an operation in the seventh mode of the heat pump system, for cooling the electrical component 24 by using the coolant cooled at the first and second radiator 22 and 42, and for increasing the temperature of the battery module 32, is described with reference to FIG. 9.

Figure 9:
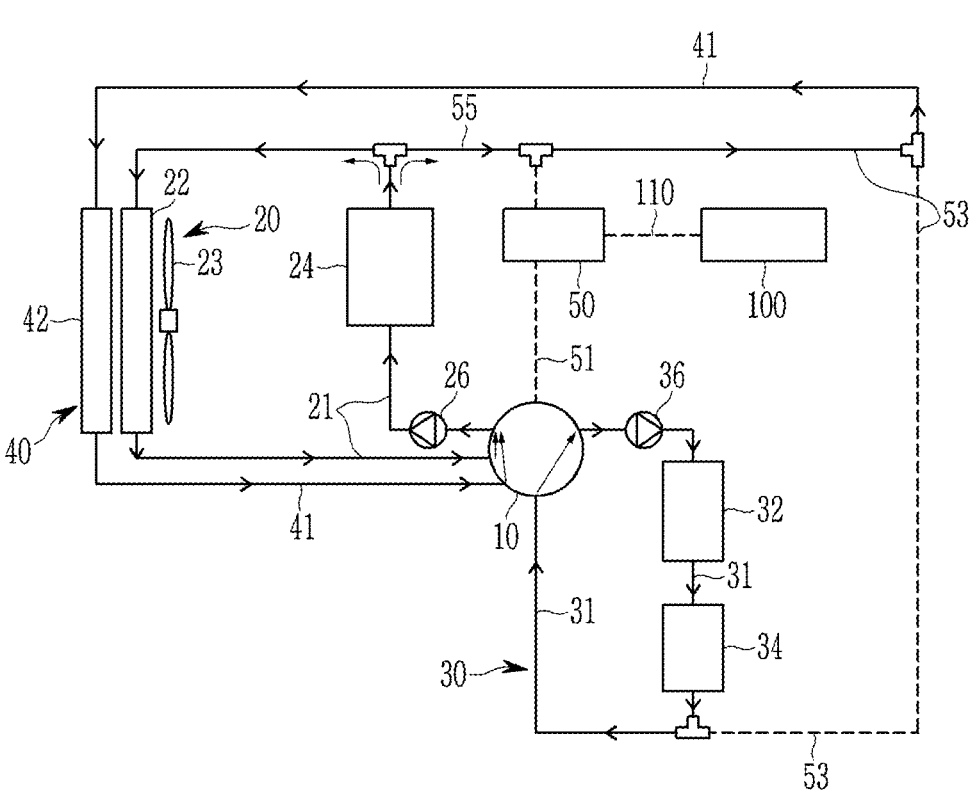
FIG. 9 is an operation diagram illustrating a seventh mode of a heat pump system for a vehicle according to an embodiment.

FIG. 9 is an operation diagram of a seventh mode of a heat pump system of a vehicle according to an embodiment.

Referring to FIG. 9, in the seventh mode, the first end of the first line 21 may be connected to the second end of the first line 21 by the operation of the valve 10 such that the coolant cooled at the first and second radiators 22 and 42 are supplied to the electrical component 24.

Simultaneously, the first end of the third line 41 may be connected to the first end of the first line 21 by the operation of the valve 10.

In addition, the first end of the second line 31 may be connected to the second end of the second line 31 by the operation of the valve 10, such that the second line 31 forms an independent closed circuit.

The first connection line 51 is closed by the operation of the valve 10. In addition, a portion of the second connection line 53 connecting the second line 31 and the third line 41 is closed.

Simultaneously, a portion of the second connection line 53 may be opened such that the second end of the third line 41 is connected to the third connection line 55.

The air conditioner unit 100 may stop operating.

In such a state, when the first water pump 26 is operated, the coolant cooled at the first radiator 22 is drawn into the valve 10 along the first line 21, and then discharged through the first line 21.

At the same time, the coolant cooled at the second radiator 42 is flowed into the valve 10 along the third line 41, and then discharged through the first line 21.

In other words, each coolant cooled at the first and second radiators 22 and 42 is discharged to the first line 21, and the coolant discharged to the first line 21 may efficiently cool the electrical component 24 while passing through the electrical component 24.

A partial coolant of the coolant having passed through the electrical component 24 may flow into the first radiator 22 along the first line 21. The coolant introduced into the first radiator 22 may be cooled by exchanging heat with the ambient air.

The remaining coolant of the coolant having passed through the electrical component 24 flows into the second radiator 42 along the opened third connection line 55, a portion of the second connection line 53, and the third line 41. The coolant introduced into the second radiator 42 may be cooled by exchanging heat with the ambient air.

In other words, the coolant cooled at the first and second radiators 22 and 42 may cool the electrical component 24 more efficiently while repeatedly performing the above-described operation.

The second water pump 36 may be operated to circulate the coolant along the second line 31.

When the second water pump 36 is operated, the coolant may be circulated along the second line 31.

In other words, the coolant discharged from the valve 10 to the second line 31 sequentially passes through the battery module 32 and the coolant heater 34, and then flows back into the valve 10, to circulate along the valve 10 and the second line 31.

The coolant heater 34 may efficiently increase the temperature of the battery module 32 by heating the coolant circulating along the second line 31.

As such, in the seventh mode, by repeatedly performing the above-described processes, the electrical component 24 may be efficiently cooled by using the coolant cooled at the first and second radiators 22 and 42.

Additionally, in the seventh mode, by operating the coolant heater 34 provided in the second line 31, the temperature of the coolant circulating along the second line 31 may be quickly raised and supplied to the battery module 32, and the temperature of the battery module 32 may be efficiently adjusted.

According to a heat pump system for a vehicle according to an embodiment, the system may adjust a temperature of the battery module 32 by using a single chiller 50 where a refrigerant and a coolant exchange heat, and selectively recollect the waste heat of the electrical component 24 and the battery module 32. Additionally, by using the same for heating of the vehicle, the overall efficiency of the system may be enhanced.

In addition, according to the present disclosure, by forming the plurality of coolant flow lines by using a single valve 10 according to the selected mode of the vehicle, the system may be streamlined and simplified while reducing manufacturing costs.

In addition, according to the present disclosure, independent temperature adjustment of the battery module 32 may be achieved regardless of cooling the electrical component 24. Additionally, by operation of the air conditioner unit 100, optimal performance of the battery module 32 may be obtained by efficiently adjusting the temperature of the battery module 32. Furthermore, the overall travel distance of the vehicle may be increased through the efficient management of the battery module 32.

In addition, according to an embodiment, it is possible to reduce manufacturing cost and weight through simplification of an entire system, and to improve space utilization.

While the present disclosure has been described in connection with what is presently considered to be practical embodiments, it should be understood that the disclosure is not limited to the disclosed embodiments. On the contrary, the present disclosure is intended to cover various modifications and equivalent arrangements included within the spirit and scope of the appended claims.

DESCRIPTION OF SYMBOLS

10: valve
20: first cooling apparatus
21: first line
22: first radiator
23: cooling fan
24: electrical component

26: first water pump
30: second cooling apparatus
31: second line
32: battery module
34: coolant heater
36: second water pump
40: third cooling apparatus
41: third line
42: second radiator
50: chiller
51: first connection line
53: second connection line
55: third connection line
100: air conditioner unit
110: refrigerant connection line

What is claimed is:

1. A heat pump system of a vehicle, comprising:
a valve configured to control flow movement of a coolant that is interiorly introduced, based on at least one mode for temperature adjustment of a vehicle interior and temperature adjustment of a battery module;
a first cooling apparatus including a first line of which a first end and a second end are connected to the valve to selectively circulate the coolant, a first radiator, and an electrical component, wherein the first radiator and the electrical component are provided on the first line;
a second cooling apparatus that includes a second line of which a first end and a second end are connected to the battery module and the valve to selectively circulate the coolant, wherein the battery module is provided on the second line;
a third cooling apparatus that comprises a third line of which a first end is connected to the valve to selectively circulate the coolant, wherein the second radiator is provided on the third line;
a first connection line of which a first end is connected to the valve to selectively circulate the coolant, wherein a chiller is provided in the first connection line;
a second connection line including: a first end connected to the second line, and a second end connected to the first connection line; and
a third connection line including:
a first end connected to a second end of the first connection line, and
a second end connected to the first line between the first radiator and the electrical component,
wherein the valve is configured to operate such that one line among the first line, the second line, the third line, and the first connection line is connected to another line or the same line, depending on a selected mode among the at least one mode.

2. The heat pump system of claim 1, wherein:
a first water pump is provided in the first line between the valve and the electrical component; and
a second water pump is provided in the second line between the valve and the battery module.

3. The heat pump system of claim 1, wherein:
a second end of the third line is connected to the second connection line.

4. The heat pump system of claim 1, wherein the at least one mode comprises:
a first mode for cooling the electrical component by using a coolant cooled at the first radiator and for increasing the temperature of the battery module;

a second mode for cooling the electrical component by using the coolant cooled at the first radiator and for cooling the battery module by using the coolant cooled at a second radiator;

a third mode for cooling the electrical component by using the coolant cooled at the first radiator and for cooling the battery module by using the coolant having exchanged heat in the chiller;

a fourth mode for heating the vehicle interior and for increasing the temperature of the battery module while recovering waste heat of the electrical component;

a fifth mode for heating the vehicle interior and for recovering waste heat of the electrical component and the battery module;

a sixth mode for cooling the electrical component by using the coolant cooled at the first and second radiators and for cooling the battery module by using the coolant having exchanged heat in the chiller; and a seventh mode for cooling the electrical component by using the coolant cooled at the first and second radiators and for increasing a temperature of the battery module.

5. The heat pump system of claim 4, wherein, in the first mode:

the first end of the first line is connected to the second end of the first line by an operation of the valve such that the first line forms an independent closed circuit in order to supply the coolant cooled at the first radiator to the electrical component;

the first end of the second line is connected to the second end of the second line by the operation of the valve such that the second line forms an independent closed circuit;

the third line is closed by the operation of the valve;

the first connection line is closed by the operation of the valve;

the second connection line is closed by the closed first connection line; and the coolant stops flowing via the third connection line.

6. The heat pump system of claim 4, wherein, in the second mode:

the first end of the first line is connected to the second end of the first line by an operation of the valve such that the first line forms an independent closed circuit in order to supply the coolant cooled at the first radiator to the electrical component;

the first end of the third line is connected to the first end of the second line by the operation of the valve such that the coolant cooled at the second radiator is supplied to the battery module;

the second end of the second line is connected to the first end of the first connection line by the operation of the valve;

the second connection line is opened such that the second line is connected to the third line via the first connection line;

the coolant stops flowing via the third connection line;

a partial coolant of the coolant having passed through the battery module flows into the valve via the second line; and remaining coolant of the coolant having passed through the battery module via the second line flows via the opened second connection line and flows into the third line together with the coolant discharged to the first connection line.

7. The heat pump system of claim 4, wherein, in the second mode:

the first end of the first line is connected to the second end of the first line by an operation of the valve such that the first line forms an independent closed circuit in order to supply the coolant cooled at the first radiator to the electrical component;

the first end of the third line is connected to the first end of the second line by the operation of the valve such that the coolant cooled at the second radiator is supplied to the battery module;

a portion of the second line that connects the valve and a downstream side of the battery module, with reference to the flow direction of the coolant, is closed by the operation of the valve;

a portion of the second connection line is opened such that the opened second line is connected to the third line;

a portion of the second connection line connected to the first connection line and the third connection line is closed;

the coolant stops flowing via the third connection line; and the coolant having passed through the battery module via the second line from the valve flows into the second radiator via the opened second connection line and the third line connected to the second connection line.

8. The heat pump system of claim 4, wherein, in the third mode:

the first end of the first line is connected to the second end of the first line by an operation of the valve such that the first line forms an independent closed circuit in order to supply the coolant cooled at the first radiator to the electrical component;

the first end of the second line is connected to the first end of the first connection line by the operation of the valve;

a portion of the second line that connects the valve and a downstream side of the battery module, with reference to the flow direction of the coolant, is closed by the operation of the valve;

the third line is closed by the operation of the valve;

the second connection line is opened such that the second line is connected to the first connection line;

the coolant stops flowing via the third connection line; and the chiller exchanges heat between the coolant introduced via the first connection line and a refrigerant, and supplies a heat-exchanged low-temperature coolant to the battery module.

9. The heat pump system of claim 4, wherein, in the fourth mode:

with reference to the flow direction of the coolant, a portion of the first line connecting the first radiator and a downstream side of the electrical component and connecting the first radiator and the valve, is closed by the operation of the valve;

the first end of the first connection line is connected to the first end of the first line by the operation of the valve;

the first line is connected to the opened first connection line by the third connection line, at the downstream side of the electrical component;

the first end of the second line is connected to the second end of the second line by the operation of the valve such that the second line forms an independent closed circuit;

the third line is closed by the operation of the valve;

the second connection line is closed; and the chiller recollects the waste heat of the electrical component the coolant heated while cooling the electrical component.

10. The heat pump system of claim 4, wherein, in the fifth mode:

with reference to a flow direction of the coolant, a portion of the first line connecting the first radiator and a downstream side of the electrical component, and connecting the first radiator and the valve is closed by an operation of the valve;

the second end of the second line is connected to the opened portion of the first line by the operation of the valve;

the third line is closed by the operation of the valve;

the first end of the first connection line is connected to the first end of the second line by the operation of the valve;

the second connection line is opened to connect the second line and the first connection line;

the first line is connected to the first connection line by the third connection line, the downstream side of the electrical component;

the coolant having passed through the electrical component flows into the first connection line via the third connection line connected to the first line;

a partial coolant of the coolant having passed through the battery module via the second line flows into the valve via the second line;

remaining coolant of the coolant having passed through the battery module via the second line flows into the first connection line via the opened second connection line; and the chiller recollects the waste heat of the electrical component and the battery module from the coolant heated while cooling the electrical component and battery module, respectively.

11. The heat pump system of claim 4, wherein, in the sixth mode:

the first end of the first line is connected to the first end of the third line by the operation of the valve such that the coolant cooled at the first and second radiators are supplied to the electrical component;

the second end of the first line is connected to the second end of the second line by the operation of the valve;

the first end of the second line is connected to the first end of the first connection line by the operation of the valve;

the second connection line is opened such that the second line is connected to the first connection line;

the second end of the third line is connected to the second connection line;

the coolant stops flowing via the third connection line; and the chiller exchanges heat between the coolant introduced via the first connection line and a refrigerant, and supplies a heat-exchanged low-temperature coolant to the battery module via the second line.

12. The heat pump system of claim 4, wherein, in the seventh mode:

the first end of the first line is connected to the first end of the third line by the operation of the valve such that the coolant cooled at the first and second radiators are supplied to the electrical component;

the first end of the first line is connected to the second end of the first line by the operation of the valve;

the first end of the second line is connected to the second end of the second line by the operation of the valve such that the second line forms an independent closed circuit;

the first connection line is closed by the operation of the valve;

a portion of the second connection line connecting the second line and the third line is closed;

a portion of the second connection line is opened such that the second end of the third line is connected to the third connection line;

a partial coolant of the coolant having passed through the electrical component is flowed into the first radiator via the first line; and remaining coolant of the coolant having passed through the electrical component is flowed into the second radiator via the opened third connection line, a portion of the second connection line, and the third line.

13. The heat pump system of claim 1, wherein the chiller is connected to an air conditioner unit via a refrigerant connection line.

14. The heat pump system of claim 13, wherein the chiller is a water-cooled heat-exchanger that is configured to exchange heat between the interiorly introduced coolant and a refrigerant supplied from the air conditioner unit.

15. The heat pump system of claim 1, wherein a coolant heater is provided in the second line.

16. The heat pump system of claim 15, wherein, for increasing the temperature of the battery module, the coolant heater is operated such that the coolant supplied to the battery module via the second line is heated.

17. The heat pump system of claim 1, wherein the valve is a six-way valve.

\* \* \* \* \*